May 1, 1928. 1,668,108
M. L. DWYER
FOUR-HORSE MOWING MACHINE
Filed July 29, 1924
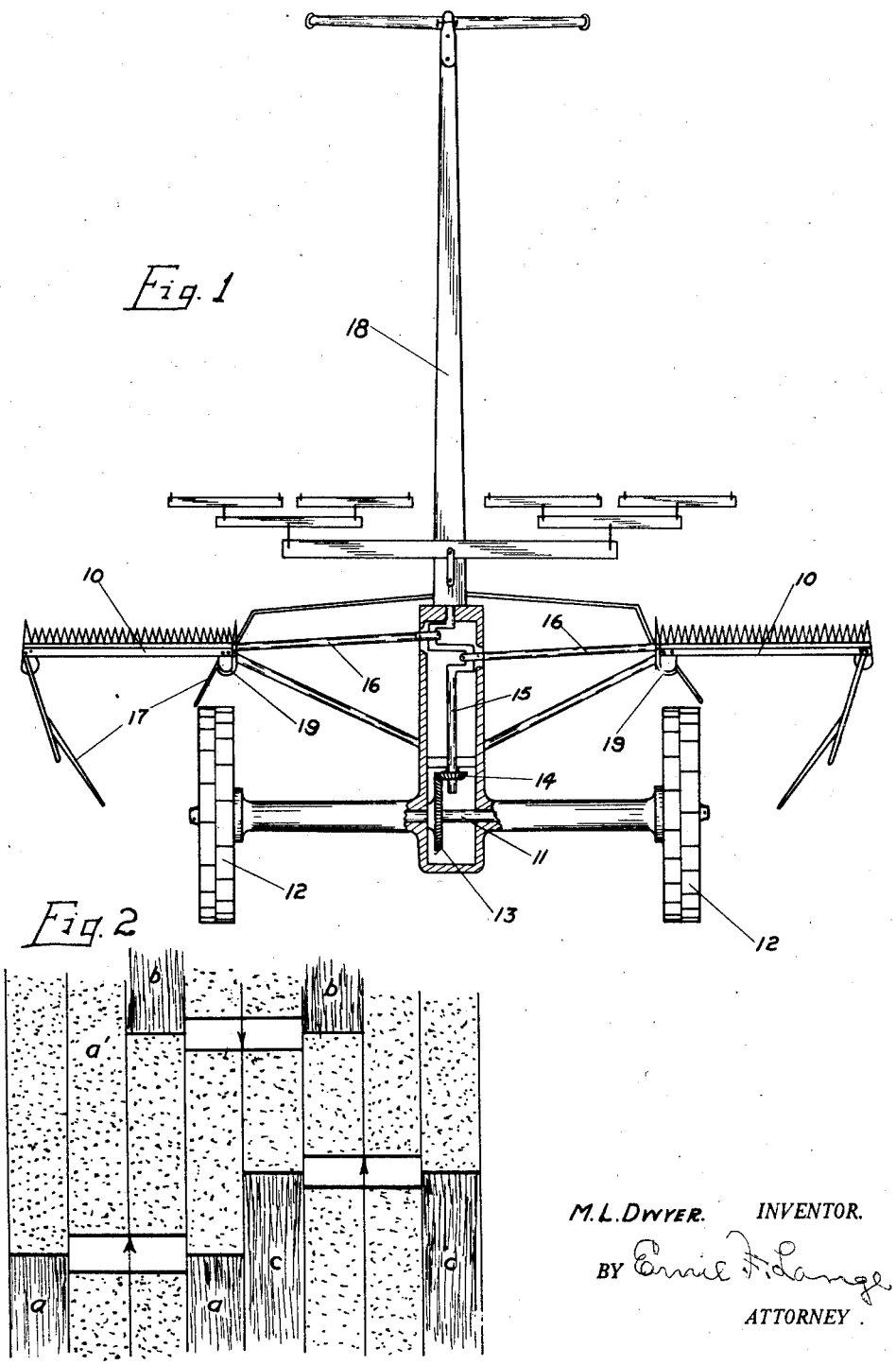
M. L. DWYER. INVENTOR.
BY
ATTORNEY.

Patented May 1, 1928.

1,668,108

UNITED STATES PATENT OFFICE.

MATHEW L. DWYER, OF ELGIN, NEBRASKA.

FOUR-HORSE MOWING MACHINE.

Application filed July 29, 1924. Serial No. 728,864.

My invention relates to mowing machines and its primary object is to provide a mowing machine whereby the operator can cut the grass at twice the rate which is possible with mowing machines of the ordinary types. It is also my object to eliminate entirely the the side draft in the machine, with all of its objectionable features. Another of my objects is the provision of a mowing machine for cutting the grass by a new and improved system. Still another of my objects is to reduce to a minimum the hazard factor common to mowing machines.

Having in view these objects and others which will be mentioned in the following description, I will now refer to the drawings in which:

Figure 1 is a plan view of my mowing machine.

Figure 2 is a diagrammatic representation of a portion of a field, showing particularly the novel system of most effectively operating the mowing machine.

Mowing machines are usually drawn by a team of two horses which are driven by the operator. The width of cut varies with the length of the cutter bar from four and a half feet to seven feet, the average width being six feet. The work accomplished by one man thus varies with the width of the cut and with the speed with which the horses draw the machine through the field. The operator could however drive four horses almost as easily as two, and if the machine is designed to utilize the extra work of the second team, the work accomplished by a man in cutting grass could be doubled. The result can not be obtained by merely doubling the length of the cutting bar on the mowing machines of the present types because the side draft would become prohibitive and also because an excessively long cutter bar can not be supported at one end only without increasing to prohibitive proportions the weight of the machine. The solution of the problem depends not on the improvement of mowing machines of the present types but rather on the development of a new type of mowing machine.

In carrying out my invention, I secure two cutter bars and sickles 10 extending from opposite sides of the frame and in opposite directions therefrom. The main frame carries a main drive shaft 11 which may be driven by either or both supporting wheels 12. The shaft 11 carries the driving gear 13 which meshes with the pinion 14. The pinion 14 thus drives the pitman crank shaft 15 to which it is secured. The pitman rods or sickle drivers 16 are secured at their inner ends to the cranks of the crank shaft 15 and at their outer ends to the sickles. Swath boards 17 of the usual forms are secured at both the inner and the outer ends of the cutter bars. The usual draft appliance 18, designed for use with four horses, is secured to the main frame.

The relative dimensions and arrangement of parts is of great importance in the proper operation of my mowing machine. The cutter bars and sickles 10 must be so spaced that the distance between their inner ends will be equal to their combined lengths or equal to twice the length of either. The inner ends of the cutter bars 10 and of the inside shoes 19 must be substantially in alignment with the inner surfaces of the supporting wheels 12. The dimensions of the various parts may be altered as desired provided the relations of the parts be maintained as above described. My preferred construction includes a cutter bar having a length of six feet, the other parts being proportioned accordingly.

In Figure 2 I show in diagram the motion of the mowing machine in the field. When starting the work the machine is driven in a path which is parallel to the edge of the field with the outer sickle cutting to the edge, both teams of horses traveling through the standing grass. In this way two six-foot cuts $a$ $a$ are made. Both supporting wheels 12, because of their position relative to the cutters, travel on stubble, the inner swath boards 17 throwing the cut grass outside the path of the supporting wheel. When the end of the field is reached the machine is turned round and driven in a path parallel to the original path but in the reverse direction, so as to make the cuts $b$ $b$, the six-foot strip $a'$ remaining uncut. When cutting the strips $b$ $b$, one team travels on stubble and the other in standing grass. When the end of the field is reached in cutting the strips $b$ $b$, the machine is again turned and driven to cut the strips $c$ $c$, with one team again traveling on stubble and the other in standing grass. This back-and-forth travel of the machine is continued until the opposite edge of the field is reached, all subsequent cuts being continuous and leaving no uncut strips similar to the strip $a'$. The strip $a'$ may be cut at any time by making a special trip with my mowing machine, or if the field is large enough to warrant it, a side draft mower of the ordinary kind may be employed to cut the strip $a'$ and a similar strip $x'$ on the opposite side of the field, and to trim at the ends of the field.

The system of cutting hay as above described has certain obvious advantages over the prior systems, and particularly over the method in common use. The customary method is to cut round the field and to work inwardly, making successive concentric cuts. At the corners however the sweep of the sickle is too great with the result that the grass is cut too high and frequently a considerable quantity remains uncut. Such hay is wasted unless the field is trimmed along diagonal lines, and even with such trimming, most of the hay thus obtained is short and is liable to be lost when gathering the hay. If the long stubble is left standing in the field, it is not only wasted but it seriously interferes with the operation of the machine during the subsequent harvests. In my system the trimming is reduced to a minimum, and there is no long stubble to be trimmed.

My mowing machine is admirably adapted for cutting the grass by this method and it also possesses marked advantages in other respects. Its greatest advantage is that it reduces the labor cost of cutting the grass by one-half. The draft of the machine is light, so that two teams with my machine can travel faster and cut more grass than could the same two teams if used separately on the side cut mowers of the usual kinds. My machine also includes several important details of considerable advantage. The inner and outer swath boards 17 working in conjunction, throw the cut grass into the form of a loose windrow and thereby reduce the work of raking, the windrow being loose enough so that the hay will cure properly. The windrows are spaced far enough from the edges of the cut to prevent the horses from traveling over them on the return cut. The cutters 10 with the inner shoes 19 overlap the supporting wheels 12 so that the inner shoes and the supporting wheels can never travel over and press into the ground the uncut grass.

Certain departures from the described construction are possible without departing from the spirit of my invention. The dimensions of the cutters and the space between them can of course be varied at will so long as the relative dimensions remain as described. Merely for illustrative purposes I have shown my preferred form 18 of draft appliance but I do not wish to limit myself to that form. In special instances as when using a tractor instead of horses, the draft appliance must be altered accordingly.

Having thus described my invention in terms which will be readily understood by others skilled in the art to which it pertains, what I believe to be new and desire to secure by Letters Patent of the United States is:—

A mowing machine comprising a frame, supporting wheels at the sides of the frame and spaced apart a distance equal substantially to twice the width of a path to be cut by a cutter of the machine, draft means extending forwardly from the frame, and a pair of reciprocating cutters mounted on the opposite sides of the frame and extending outwardly therefrom from points in advance of and in line with said supporting wheels, said cutters being of equal length and each of said cutters being of a length to cut a path of the desired width and being spaced apart at their inner ends a distance equal to twice the width of a path to be cut, whereby two paths of equal width may be cut simultaneously and side draft on the machine is eliminated.

In testimony whereof I affix my signature.

MATHEW L. DWYER.